3,345,214
FUSED ELECTROLYTE CELL
John H. Zauner, West Orange, N.J., and Glenn F. Zellhoefer, Normal, Ill., assignors, by mesne assignments, to National Union Electric Corporation, Stamford, Conn., a corporation of Delaware
No Drawing. Filed Mar. 23, 1955, Ser. No. 496,316
6 Claims. (Cl. 136—137)

This is a continuation-in-part application of co-pending United States application Ser. No. 406,609 filed Jan. 27, 1954, which is now abandoned.

This invention relates to thermal cells and methods of making the same, and has particular reference to a new and improved cell system.

Thermal cells may be defined as electrochemical power supplies based upon electrolytes of various inorganic salts which remain solid and non-conducting at all storage temperatures. When the cell is heated to some elevated temperature, the electrolyte melts and becomes conducting and electrical energy may then be withdrawn from the system.

This invention contemplates a new system wherein the product formed by crystallizing or freezing a fusion of $B_2O_3$ and $V_2O_5$ forms the cathode of the cell. Such a system is particularly advantageous because the potential of such a cathode is higher than any metal including platinum or gold, and in addition the attainable current density is exceedingly high for a thermal type cell.

A principal object of the invention is to provide a new and improved system for thermal cells.

Another object of the invention is to provide a thermal cell system having a new and improved cathode.

Another object of the invention is to provide new and improved methods of making thermal cells and cathodes therefor.

Other objects and advantages of the invention will be apparent from the following specification.

Thermal cells embodying our invention employ fused salt electrolytes such as LiCl—KCl; $CaCl_2$—NaCl—KCl; and $CdCl_2$—NaCl—KCl, admixed with a depolarizing agent; and may use a variety of anodes such as magnesium or calcium.

Our invention contemplates a thermal cell wherein the surface of the cathode exposed to and in contact with the electrolyte consists essentially of the product formed by freezing or solidifying a fusion of $B_2O_3$ and $V_2O_5$. We have obtained best results where the $B_2O_3$ comprises from about 16 to about 28% by weight of the combined weight of the two components. However, the percentage of $B_2O_3$ may vary widely depending upon the performance characteristics desired from the cell. We have found that the percentage of $B_2O_3$ in such mixtures may be as low as about 5% or as great as about 35%. However percentages of $B_2O_3$ in excess of 35% may be useful for some applications. The cathode preferably consists of a metal having a very thin coating of such product on the surface exposed to and in contact with the electrolyte. We have found coatings of the order of .002″ to .006″ to be practical. The frozen product is relatively insoluble in fused salt electrolytes and is a glassy material which is impermeable to fused salt electrolytes, even in films as thin as 0.002″. X-ray analysis indicates such product to be mostly amorphous with some crystalline dispersion. As a coating it adheres well to many of the high melting metals, yet retains flexibility, as it will continue to adhere to metal surfaces even though the same are distorted or bent. It is useable with fused salt electrolytes such as those previously mentioned and can be applied to a wide variety of metals including nickel, steel, stainless steel, aluminum and magnesium. We have found that magnesium coated with this product and used as the cathode of a cell is just as effective as a coated cathode of platinum or gold.

Cathodes using this product as a coating may be prepared by dipping a metal wire, rod or tape into a fusion of $B_2O_3$ and $V_2O_5$. We have obtained satisfactory results by heating the mixture in a nickel crucible for a substantial time interval after it has melted, say for a period of approximately two hours, while the temperature thereof is maintained between 700 and 800° C. After the mixture has been fused and heated as just described, the metal wire, rod or tape is dipped into the molten mixture and removed therefrom so as to permit the fused mixture to freeze or solidify on the metal as a fused coating therefor.

An alternate method consists of preparing a slurry of powdered $V_2O_5$ and powdered $B_2O_3$ in a non-aqueous liquid such as acetone. This slurry may then be painted on the metal and heated to cause fusion thereof. Upon cooling the coating is fused on the metal. This method just described makes it possible to accurately control the thickness of the coating and permits the application thereof on only one side of the metal when such is desired.

As used herein and unless otherwise indicated, the term "electrolyte" includes the depolarizing agent, admixed therewith. As a depolarizing agent we have found a mixture of $V_2O_5$ and a eutectic mixture of KCl and LiCl admixed with the electrolyte to be effective wherein $V_2O_5$ may constitute from 5% to 75% by weight of the mixture.

While we have illustrated a preferred embodiment of the invention, it is capable of modification and, therefore, we do not wish to be limited to the precise details set forth but desire to avail ourselves of such changes as fall within the scope of the following claims.

We claim:

1. In a fused electrolyte cell including a cathode, electrolyte, depolarizing agent and an anode, that improvement wherein the surface of the cathode exposed to and in contact with the electrolyte of the cell consists essentially of a solid solution of $B_2O_3$ and $V_2O_5$, and wherein said $B_2O_3$ comprises at least about 5% by weight of the combined weight of such components.

2. A cell according to claim 1 wherein said solid solution is in the form of a coating fused on the surface of a metal cathode member.

3. In a fused electrolyte cell including a cathode, electrolyte, depolarizing agent and an anode, that improvement wherein the surface of the cathode exposed to and in contact with the electrolyte of the cell consists essentially of a solid solution of $B_2O_3$ and $V_2O_5$, and wherein said $B_2O_3$ comprises from about 16 to about 28% by weight of the combined weight of such components.

4. A cell according to claim 3 wherein said solid solution is in the form of a coating fused on the surface of a metal cathode member.

5. In a fused electrolyte cell including a cathode, electrolyte, depolarizing agent and an anode, that improvement wherein the surface of the cathode exposed to and in contact with the electrolyte of the cell consists essentially of a solid solution of $B_2O_3$ and $V_2O_5$, and wherein said $B_2O_3$ comprises from about 5 to about 35% by weight of the combined weight of such components.

6. An article according to claim 5 wherein said coating essentially consists of a solid solution of from about 16 to 28% by weight of $B_2O_3$, and the balance $V_2O_5$.

References Cited

UNITED STATES PATENTS

| 856,162 | 6/1907 | Kitsee. | |
|---|---|---|---|
| 2,678,343 | 5/1954 | Daniel | 136—120 X |
| 2,726,279 | 12/1955 | Gobat | 136—90 |

OTHER REFERENCES

Goodrich et al.: Journal of the Electrochemical Society, vol. 99, pp. 207C, 208C, August 1952.

Vinal: Primary Batteries, pp. 321–329 (1950), John Wiley and Sons, Inc., N.Y.C.

WINSTON A. DOUGLAS, *Primary Examiner.*

WILLIAM G. WILES, CARL D. QUARFORTH,
*Examiners.*

J. D. VOIGHT, D. L WALTON, *Assistant Examiners.*